United States Patent Office 3,360,544
Patented Dec. 26, 1967

3,360,544
PROCESSES FOR PREPARING ALKYL HYDROXYALKYL FUMARATES
James C. Wygant, Creve Coeur, and Erhard J. Prill, St. Louis, Mo., assignors to Monsanto Company, a corporation of Delaware
No Drawing. Filed July 19, 1963, Ser. No. 296,387
9 Claims. (Cl. 260—485)

This invention relates to processes for preparing alkyl hydroxyalkyl fumarates and especially concerns the catalyzed reaction of alkylene oxides with alkyl hydrogen fumarates.

Alkyl hydroxyalkyl fumarates are particularly desirable monomers and can be copolymerized with vinyl chloride or other unsaturated compounds which are polymerizable with fumaric diesters. The resulting copolymers have free hydroxyl groups which provide sites for crosslinking or additional reactions.

Alkyl hydroxyalkyl fumarates are reported to be preparable by slowly adding the acid halide of an alkyl hydrogen fumarate to an excess of glycol or by reaction between an halo-hydrin and the silver salt of an alkyl hydrogen fumarate.

These methods are however unsuited for producing an inexpensive product in high yield having the purity required for subsequent use as a monomer. The prior art reactions are further undesirable as being at least 2-step processes requiring isolation of an acid chloride or a silver salt of the alkyl hydrogen fumarate as intermediates.

It is an object of the present invention to provide a process for preparing alkyl hydroxyalkyl fumarates in high yield which process is suitable for industrial use.

Another object of this invention is to provide a process for preparing alkyl hydroxyalkyl fumarates of high purity and without objectionable by-products.

Another object is to provide a single-step process for preparing alkyl hydroxyalkyl fumarates starting with alkyl hydrogen fumarates.

Another object is to provide a practical catalytic process for preparing alkyl hydroxyalkyl fumarates from alkyl hydrogen fumarates and alkylene oxides.

Another object is to provide catalysts for use in preparing alkyl hydroxyalkyl fumarates by the alkylene oxide reaction with alkyl hydrogen fumarates which catalysts can readily be removed from the reaction mixture.

Another object is to provide a process for reacting alkyl hydrogen fumarates and alkylene oxides to give a blend of products containing alkyl hydroxyalkyl fumarates as the predominant product.

Another object is to provide means to determine where to stop the reaction between alkyl hydrogen fumarate and alkylene oxide so as to obtain alkyl hydroxyalkyl fumarate of both high yield and purity.

The processes of the present invention can be represented by the equation:

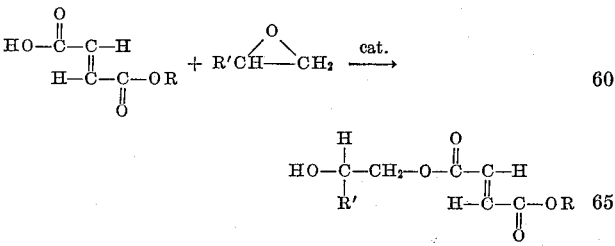

where R is a lower alkyl radical having no more than about 12 carbon atoms and preferably no more than 6 carbons; and where R' is hydrogen or a lower alkyl radical having no more than about 6 carbon atoms (i.e., the alkylene oxide has no more than about 8 carbon atoms) and preferably no more than about 2 carbons (ie., the alkylene oxide has no more than about 4 carbons).

R and R' may be straight-chained, branched, or cyclic.

Examples of R include methyl, ethyl, isopropyl, n-propyl, n-butyl, sec-butyl, n-amyl, n-hexyl, cyclohexyl, n-heptyl, n-octyl, isooctyl, 2-ethylhexyl, n-nonyl, n-decyl, n-undecyl, n-dodecyl, etc.

For use in the presently disclosed processes R preferably has about 6 or fewer carbon atoms. From a utility aspect particularly preferred are those compounds where R is methyl, ethyl, isopropyl, or n-butyl.

Examples of R' where R' is lower alkyl include methyl, ethyl, isopropyl, n-propyl, n-butyl, sec-butyl, n-amyl, n-hexyl, etc.

Preferably for use in this invention R' is hydrogen or methyl (i.e., the alkylene oxide is ethylene oxide or propylene oxide).

The alkylene oxide reaction according to this invention is catalyzed with an alkyl metal fumarate. Suitable catalysts include alkali metal salts, e.g., alkyl lithium fumarate, alkyl sodium fumarate, alkyl potassium fumarate, and alkyl rubidium fumarate, and the alkaline earth metal salts, e.g., alkyl magnesium fumarate, alkyl calcium fumarate, alkyl strontium fumarate, and alkyl barium fumarate.

The alkyl metal fumarate is usually formed in situ from alkyl hydrogen fumarate and an alkali metal compound or an alkaline earth metal compound which is basic relative to the alkyl hydrogen fumarate. For example alkali or alkaline metal compounds such as carbonates, bicarbonates, hydroxides, carboxylates, and like compounds which react with alkyl hydrogen fumarate to form alkyl metal fumarate can be used to prepare the present catalysts.

For convenience the following discussion to some extent is limited to the preferred embodiment of the invention, i.e., a detailed description of the reaction products is presented for the reaction of ethylene oxide with alkyl hydrogen fumarates.

An alkyl hydrogen fumarate and ethylene oxide react according to the conditions employed to produce essentially 3 major product types:

A.

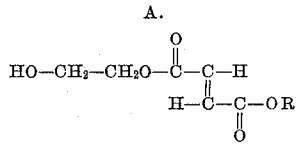

Alkyl 2-hydroxyethyl fumarate

B.

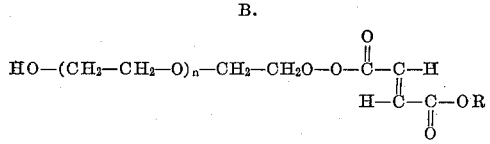

$n=1$, alkyl 2-(2'-hydroxyethoxy)ethyl fumarate

C.

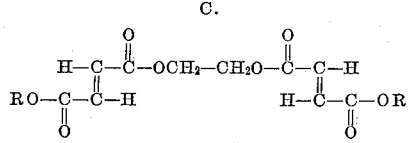

Ethylene glycol bis(alkyl fumarate)

Structure A is the primary product of the reaction.

Structure B is the reaction product of the main product A with one or more additional molecules of ethylene oxide. Normally the higher homologues of structure B are produced in very small quantities and alkyl 2-(2'-hydroxyethoxy)ethyl fumarate is the only member of this product type present in significant amounts. This material (B), being a hydroxylated mono-fumarate, is useful in producing crosslinkable vinyl monomers and its presence in the product blend is not objectionable.

Structure C is produced by ester interchange reactions and being a hydroxylated bis-fumarate can lead to insoluble, crosslinked polymers. Its concentration must therefore be kept at a low level.

By the processes of the present invention it is possible to choose and control the reaction conditions to produce alkyl 2-hydroxyethyl fumarate (A) in high yield and with a minimum amount of ethylene glycol bis(alkyl fumarate), structure C, being formed.

Preferably the alkylene oxide reaction is carried out in the absence of a solvent—the alkyl hydrogen fumarate being simply melted and alkylene oxide introduced. However, where desired, a solvent for the alkyl hydrogen fumarate, e.g., aromatic hydrocarbons, ethers, alcohols, nitriles, etc., can be employed in whatever amount desired.

Preferably about 2 to 5 equivalent percent of alkyl hydrogen fumarate is converted into catalyst, i.e., alkyl metal fumarate. Higher amounts of catalyst, such as 10 equivalent percent or more based on the alkyl hydrogen fumarate, can be used, however, this causes a correspondingly reduced yield of product. On the other hand about one equivalent percent or as little as 0.10 equivalent percent, based on the alkyl hydrogen fumarate, may be used by extending the reaction time.

Reaction temperature is maintained above the melting point of the alkyl hydrogen fumarate and below about 250° centigrade. However, where a reaction solvent is employed a lower temperature may be used. As a rule the most suitable temperature range is from about 75° to 150° centigrade.

The pressure at which the reaction is run is non-critical but commonly will be from about 1–2 atmospheres though much higher pressures can be employed.

Reaction is started by passing alkylene oxide or alkylene oxide contained in an inert diluent (e.g., nitrogen, methane, butane, etc.) into the reaction vessel.

The flow of alkylene oxide is continued and reaction is allowed to proceed until a product having the desired acid number is obtained. Careful control must be exercised to terminate the reaction at the proper time. For the processes of this invention the final acid number is required to be about 10 to 30 and preferably about 10 to 20.

If the alkylene oxide reaction is stopped when the mixture has a higher acid number there will be a large percentage of unconverted alkyl hydrogen fumarate. If the reaction is continued until the acid number drops to about 5 or lower a large amount of alkylene glycol bis-(alkyl fumarate) begins to form. The alkylene glycol bis(alkyl fumarate) renders the alkyl 2-hydroxyethyl fumarate unsuitable for subsequent use as a monomer because it causes undesirable crosslinking reactions.

Therefore it is impractical to attempt to achieve complete conversion of the alkyl hydrogen fumarate and alkylene oxide reaction must be halted before an acid number much less than 10 is reached but still the reaction should be run to obtain as low an acid number as possible observing this limitation.

The metal initiator, present as alkyl metal fumarate, is generally precipitated from the reaction mixture by adding an equivalent amount of hydrogen halide. For this purpose anhydrous hydrogen halide is preferred in order to keep water out of the system.

*Example*

To a reactor equipped with stirrer, thermometer, gas inlet adapter, sampling tube, and outlet connected to a mercury manometer and mounted on a balance is charged 576 g. (4 moles) ethyl hydrogen fumarate and anhydrous $K_2CO_3$ is added to form ethyl potassium fumarate in the amounts shown in the table. The apparatus is heated to ca. 70° C., to melt the ethyl hydrogen fumarate and flushed 3 times each with $N_2$ and ethylene oxide by pressuring to ca. 115 cm. of mercury and venting. The reactor is heated to the desired reaction temperature and the stirrer started. Ethylene oxide is fed into the vessel to start the reaction and its flow is adjusted to control the pressure. Reaction temperature is maintained within the desired range by means of an air stream played on the outside of the reactor. After approximately the theoretical weight increase is recorded, a sample is taken and titrated with standard KOH solution to determine its acid number.[1] This procedure is repeated at set intervals until the reaction mixture has the desired acid number. The flow of ethylene oxide is stopped and the reactor is vented and flushed with $N_2$ 3 times while allowing to cool. Finally a vacuum (ca. 20 mm.) is applied to the system to remove residual ethylene oxide. Results are tabulated below.

The last 3 columns represent the ratios of the major products as determined by calculation of area percentages from gas chromatograph traces. VPC analyses are done on an F&M 500 instrument, using a very short (8″), lightly loaded column (1% Carbowax 6000+ on acid-washed Chromosorb W).

Runs 1 and 2 show the importance of using a catalyst, i.e., even after extended reaction there still remains considerable unconverted ethyl hydrogen fumarate. Also most significant is the fact that ca. half of the reaction product is ethyl 2-(2′-hydroxyethoxy)ethyl fumarate and ethylene glycol bis(ethyl fumarate).

In runs 3 and 4 one equiv. percent of catalyst is employed. After ca. 6 hrs. reaction time only ca. 5% of unconverted ethyl hydrogen fumarate remains. Also the

TABLE

| Run | Cat., equiv. percent | Reaction Temp., °C. | Pressure cm. of Hg | Time, Hrs. | Final Acid No. | Unconverted EHF, percent | Reaction Products | | |
|---|---|---|---|---|---|---|---|---|---|
| | | | | | | | A, percent | B, percent | C, percent |
| 1 | 0 | 80 | 110 | 4.2 | 168 | 44.0 | 19.3 | 24.5 | 12.2 |
| 2 | 0 | 80–115 | 110 | 8.0 | 63 | 16.4 | 45.6 | 23.2 | 14.8 |
| 3 | 1 | 80 | 115 | 6.0 | 22 | 5.6 | 77.5 | 12.5 | 4.4 |
| 4 | 1 | 100 | 76 | 6.5 | 18 | 4.5 | 77.8 | 10.1 | 7.6 |
| 5 | 2 | 80 | 115 | 4.5 | 17 | 4.2 | 83.8 | 8.7 | 3.2 |
| 6 | 2 | 80 | 110 | 4.1 | 16 | 4.0 | 82.2 | 9.6 | 4.2 |
| 7 | 2 | 80–100 | 110 | 2.0 | 12 | 3.0 | 84.2 | 9.3 | 3.6 |
| 8 | 3.5 | 80 | 110 | 2.6 | 15 | 3.8 | 86.9 | 6.5 | 2.9 |
| 9 | 5 | 80 | 110 | 3.5 | 1 | 0.2 | 66.9 | 3.4 | 29.5 |
| 10 | 5 | 80 | 111–115 | 2.2 | 16 | 4.0 | 89.2 | 4.8 | 2.0 |
| 11 | 5 | 70 | 110 | 3.2 | 17 | 4.4 | 87.9 | 5.6 | 2.1 |
| 12 [1] | 5 | 80 | 110–115 | 3.0 | 10 | 2.7 | 90.7 | 4.6 | 2.0 |
| 13 [2] | 5 | 80 | 110–115 | 4.8 | 14 | 3.5 | 90.5 | 3.9 | 2.1 |

Cat.=Ethyl potassium fumarate.
EHF=Ethyl hydrogen fumarate.
A=Ethyl 2-hydroxyethyl fumarate.
B=Ethyl 2-(2′-hydroxyethoxy)ethyl fumarate.
C=Ethylene glycol bis(ethyl fumarate).

[1] Charge contains 10 weight percent t-butanol based on original ethyl hydrogen fumarate.
[2] Charge contains 50 weight percent toluene based on original ethyl hydrogen fumarate.

---

[1] Acid number is a number which indicates the amount of free acid present in a substance. It is expressed by the number of mg. of potassium hydroxide which are required to neutralize the acid in a g. of the substance.

formation of by-products is reduced to acceptable proportions.

Runs 5, 6 and 7 use 2 equiv. percent of catalyst and show still further improvement in product distribution. Over 80% of the reaction mixture is ethyl 2-hydroxyethyl fumarate and there is less than 10% of unconverted ethyl hydrogen fumarate.

Run 8 employed 3.5 equiv. percent of catalyst. Results are only slightly improved over runs with 2.0 g. equiv. percent of catalyst.

Runs 9, 10, 11, 12 and 13 have 5.0 equiv. percent of catalyst. Substantially all the ethyl hydrogen fumarate is converted in run 9, however, ca. a third of the product is ethylene glycol bis(ethyl fumarate). By stopping the reaction when ca. 4% unconverted ethyl hydrogen fumarate remains the formation of ethylene glycol bis(ethyl fumarate) is reduced to ca. 2%.

There seems to be little or no advantage in operating in solvents (runs 12 and 13) or at 70° C. (run 11) instead of at 80° C., or higher. Somewhat more ethylene glycol bis(ethyl fumarate) is produced when after running most of the reaction at 80° C., the run is finished off at 100° C. (run 7).

Several examples are run to confirm that the above procedures can be used for preparing alkyl 2-hydroxyethyl fumarates other than ethyl 2-hydroxyethyl fumarate.

For instance methyl hydrogen fumarate and ethylene oxide in the presence of 2 equiv. percent of methyl potassium fumarate gives 86.1% methyl 2-hydroxyethyl fumarate; isopropyl hydrogen fumarate on treatment with ethylene oxide with 2 equiv. percent of isopropyl potassium fumarate yields 81.3% isopropyl 2-hydroxyethyl fumarate; n-butyl hydrogen fumarate reacts with ethylene oxide in the presence of 2 equiv. of n-butyl potassium fumarate to give n-butyl 2-hydroxyethyl fumarate in 80.8% yield; etc.

Preparations of alkyl 2-hydroxyalkyl fumarates are also accomplished using other alkali metal fumarates and also alkaline earth metal fumarates as catalysts.

Runs using 2 equiv. percent each of alkyl lithium fumarate and alkyl sodium fumarate do not give as good product distributions as the alkyl potassium fumarate.

Two equiv. percent of alkyl rubidium fumarate gives slightly higher yields of alkyl 2-hydroxyalkyl fumarates than alkyl potassium fumarate under comparable conditions.

Reactions with 2 equiv. percent each with a magnesium, calcium, strontium, and barium fumarate catalyst give good product distributions.

Propylene oxide was used to produce methyl 2-hydroxy-n-propyl fumarate, ethyl 2-hydroxy-n-propyl fumarate, and n-propyl 2-hydroxy-n-propyl fumarate following the procedure as outlined for ethylene oxide.

What is claimed is:

1. A process for preparing alkyl 2-hydroxyalkyl fumarates which comprises reacting an alkylene oxide selected from the group consisting of ethylene oxide and propylene oxide and an alkyl hydrogen fumarate where the alkyl group has no more than about 12 carbon atoms in the presence of an alkyl metal fumarate catalyst where the metal in the fumarate salt is selected from the group consisting of alkali metals and alkaline earth metals and where the catalyst is used in an amount equal to about 0.1 to 10 equivalent percent based on the alkyl hydrogen fumarate and the temperature is maintained between about 75° to 150° C. and stopping the reaction when the acid number of the reaction mixture is about 10 to 30 by stopping flow of alkylene oxide to the reaction mixture and permitting the reaction mixture to cool.

2. A process for preparing alkyl 2-hydroxyalkyl fumarates which comprises reacting an alkylene oxide selected from the group consisting of ethylene oxide and propylene oxide and an alkyl hydrogen fumarate where the alkyl group has no more than about 6 carbon atoms in the presence of an alkyl metal fumarate catalyst where the metal in the fumarate salt is selected from the group consisting of alkali metals and alkaline earth metals and where the catalyst is used in an amount equal to about 1 to 10 equivalent percent based on the alkyl hydrogen fumarate wherein the reaction temperature is maintained above the melting point of the alkyl hydrogen fumarate and below about 150° centigrade and stopping the reaction when the acid number of the reaction mixture is about 10 to 20 by stopping flow of alkylene oxide to the reaction mixture and permitting the reaction mixture to cool.

3. A process for preparing alkyl 2-hydroxyethyl fumarates which comprises reacting ethylene oxide and an alkyl hydrogen fumarate where the alkyl group has no more than about 6 carbon atoms in the presence of an alkyl metal fumarate where the metal in the fumarate salt is selected from the group consisting of alkali metals and alkaline earth metals and where the catalyst is used in an amount equal to about 2 to 5 equivalent percent based on the alkyl hydrogen fumarate wherein the reaction temperature is maintained above the melting point of the alkyl hydrogen fumarate and below about 150° centigrade and stopping the reaction when the acid number of the reaction mixture is about 10 to 20 by stopping flow of alkylene oxide to the reaction mixture and permitting the reaction mixture to cool.

4. A process for preparing alkyl 2-hydroxyethyl fumarates which comprises reacting ethylene oxide and an alkyl hydrogen fumarate in the presence of an alkyl metal fumarate where the alkyl group has no more than about 12 carbon atoms where the metal in the fumarate salt is an alkali metal and where the catalyst is used in an amount equal to about 2 to 5 equivalent percent based on the alkyl hydrogen fumarate wherein the reaction temperature is maintained between about 75° to 150° centigrade and stopping the reaction when the acid number of the reaction mixture is about 10 to 20 by stopping flow of alkylene oxide to the reaction mixture and permitting the reaction mixture to cool.

5. The process of claim 4 where methyl 2-hydroxyethyl fumarate is prepared.

6. The process of claim 4 where ethyl 2-hydroxyethyl fumarate is prepared.

7. The process of claim 4 where isopropyl 2-hydroxyethyl fumarate is prepared.

8. The process of claim 4 where n-propyl 2-hydroxyethyl fumarate is prepared.

9. The process of claim 4 where n-butyl 2-hydroxyethyl fumarate is prepared.

References Cited

UNITED STATES PATENTS

| | | | |
|---|---|---|---|
| 2,386,446 | 10/1945 | De Groote et al. | 260—485 |
| 2,910,490 | 10/1959 | Malkeneus | 260—485 |
| 2,929,835 | 3/1960 | Hayes et al. | 260—486 |
| 2,932,662 | 4/1960 | Ringwald | 260—475 |
| 3,190,899 | 6/1965 | Walton et al. | 260—485 |

LORRAINE A. WEINBERGER, *Primary Examiner.*

RICHARD K. JACKSON, *Examiner.*

I. R. PELLMAN, *Assistant Examiner.*